Patented Feb. 1, 1938

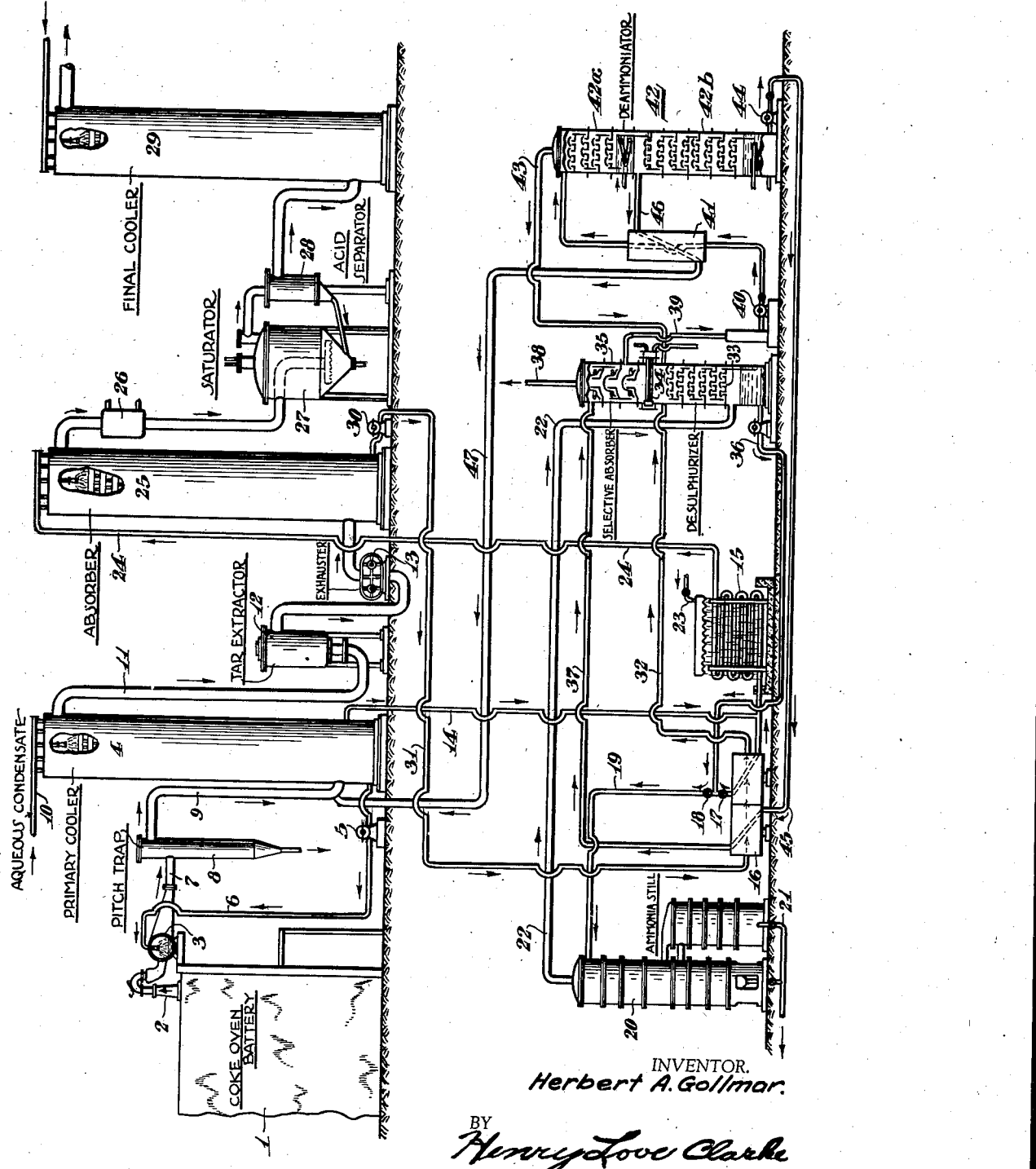

2,106,734

UNITED STATES PATENT OFFICE 2,106,734

GAS PURIFICATION PROCESS

Herbert A. Gollmar, Union Township, N. J., assignor, by mesne assignments, to Koppers Company, a corporation of Delaware Application February 27, 1935, Serial No. 8,501

15 Claims. (Cl. 23—3)

This invention relates in general to a process of purifying coal-gas or the like of acidic gases by means of ammonia with separation of the ammonia and acidic gases into their chemical classes, and more particularly to a method which permits of the production of substantially pure hydrogen sulphide from such gaseous mixtures as are evolved from coal during its carbonization. By "acidic gases" as hereinafter referred to I mean those gases which in solution in water are acid in reaction but which are easily volatilized unchanged upon heating.

The gaseous mixture given off during the carbonization period is composed not only of chemically neutral derivatives of carbon but also of substantial amounts of hydrogen sulphide, hydrogen cyanide, carbon dioxide and ammonia, and the substantially complete removal of these last named compounds is highly desirable before the introduction of the gases of carbonization into a distribution system or before it is used as a fuel. If these chemical entities are present in the gas in proper proportions, they can be used for their mutual extraction.

In the prior art various methods have been tried to accomplish this end but they have proven economically unsatisfactory because of the ammonia losses experienced, the extensive equipment required in the various applications and the disposal of excessive amounts of waste liquor.

In my present invention, I provide a means whereby substantially all hydrogen sulphide can be removed from such gases by means of ammonia without serious material loss of the latter, avoiding as well other objections that have arisen in the prior art attendant upon any application of this idea to the practice.

That a simple washing of a gaseous admixture containing ammonia and acidic gases such as HCN, $CO_2$ and $H_2S$ with water or ammonia liquor in the manner long established in the art, will serve to remove not only the ammonia but the acidic gases as well, is a fact long known in the practice. Whether a complete or only partial removal of these acidic constituents is effected, depends upon the ratio of ammonia to acidic compounds in the gas treated and in most cases where a complete removal of the latter is desired, the ammonia content must be substantially increased above that normally present; but as hereinafter described the ammonia used for this purpose in my invention is continuously recovered and returned to the gas scrubbing system in such manner as to permit of the normal quantity of ammonia present in the carbonization gases being carried forward to the saturator, and that ammonia which is used for the purpose of fortification being retained in a separate or secondary system where it is continuously re-used for the removal of the acidic gases.

My invention relates in particular to a method whereby ammonium salts of the acidic gases such as are formed in the scrubbing solution during the washing operation may be subsequently substantially separated into acidic gases and ammonia, following which separation the acidic gases consisting principally of hydrogen sulphide can be burned for the manufacture of sulphuric acid or production of elemental sulphur as by the method of Claus, whereas the ammonia may be returned to the scrubbing system for further effective use in removal of more of the aforementioned acidic gases. This separation is accomplished by first heating the fouled scrubbing solution from the absorber, (i. e. the solution containing ammonium sulphide, carbonate and cyanide) at optimum temperatures and in such manner as to remove the absorbed acidic gases from the same, whereupon the liberated gases consisting of steam, some ammonia and principally hydrogen sulphide are separated by means of a selective absorbent which has a greater affinity for ammonia than it has for the acidic gases. The ammonia can then be substantially completely retained in the selective absorbent and the acidic gases pass out of the system to be made optional disposition of. The selective absorbent now carrying absorbed ammonia may be next subjected to a distillation process, thus liberating the absorbed ammonia which may be returned to the untreated gases produced in the carbonization process, to be again used for the removal of more of the acidic gases. The selective absorbent having been deprived of its ammonia content may then again be used for the separation of more ammonia from its admixture with the acidic gases. The discovery of this application of preferential or selective absorbents and their method of use is among the novel parts of this invention. The invention has for further objects such other improvements and such other operative advantages or results as may be found to obtain in the processes or apparatus hereinafter described or claimed.

In the accompanying drawing forming a part of this specification and showing for purposes of exemplification, a preferred form and manner in which the invention may be embodied and practiced, but without limiting the claimed invention specifically to such illustrative instance or instances, the single figure shows diagrammatically in elevation the flow of liquids and gases in their preferred sequence of operation for the practice of the invention.

The gases evolved during the carbonization of the coal in the coke-oven 1 rise through the ascension pipe 2 and pass into the collecting main 3 where they are sprayed with gas liquor which is pumped from the bottom of the primary cooler 4 by means of pump 5 through line 6, in which operation the hot gases are somewhat cooled and a portion of the tar-fog is condensed. The gas liquor and condensed tar overflow through 7 into pitch-trap 8 from which they are sent to storage. The distillation gases simultaneously pass through 7 and pass from pitch-trap 8 through pipe 9 into the bottom of primary cooler 4, where they meet a counter-current flow of water, gas liquor, or combination of both, which enters the cooler 4 by means of spray-header 10, and which operative step further cools the gases, and at the same time removes some additional tar as well as some ammonia and a portion of the acidic gases. The ammoniacal liquor collects in the base of 4 while the gas passes from the cooler, through downcomer 11 to the final tar extractor 12 and to exhauster 13. From the base of 4 the ammoniacal liquor passes by means of line 14 to cooling coils 15, where its temperature is reduced by indirect contact with cooling water distributed from 23, whence it flows through line 24 to the spray-header atop absorber 25, where the gas liquor is again brought in contact in counter-current flow with the gas pumped into the bottom of the absorber 25 by the exhauster 13. This step affords the ammonia bearing gas liquor passing through 24 opportunity to effect further removal of the acidic gases from the gases of carbonization passing through the absorber. It is evident from the prior art that the extent of removal effected depends upon the ammoniacal concentration of said gas liquor and its rate of circulation, as well as the concentration of acidic gases in the gases of carbonization and the rate of flow of the latter through the absorber 25. If complete removal of the acidic gases is desired, a higher concentration of ammonia in the gas liquor may be required than otherwise. The coal gas now partially freed or completely purified of acidic gases passes to reheater 26 and on into saturator 27 where its ammonia content is removed by sulphuric acid in the customary manner; then passes to an acid separator 28 and into the final cooler 29.

The now fouled gas liquor collects at the bottom of the absorber 25 and by pump 30 passes to line 31 through heat exchanger 16 into line 32 and discharges into the desulphurizer 33. In the desulphurizer the fouled gas liquor flows over trays equipped with bubble-caps and through which the hot ammonia vapors from the ammonia still 20 carried by pipe 22 pass in counter-current manner, heating the fouled liquor, thus causing it to liberate a substantial proportion of the absorbed acidic gases. The elimination of these acidic gases from the fouled solution is accompanied by some ammonia.

The hot mixed gases then pass upward over a dephlegmator 34 where they are somewhat cooled and a portion of their water vapor is condensed out which returns to the desulphurizer, whereas the ammonia and acidic gases pass on into the selective absorber 35. The dephlegmator thus serves to reduce the amount of water that passes into the selective absorber and assists in maintaining the desired concentration of the selective absorbent and also serves to only moderately cool the vapors to a temperature still high enough and at which the selective absorbent solution will not absorb more than a minor amount of $H_2S$ while simultaneously preferentially absorbing the ammonia. Such dephlegmation thus both effects condensation that would otherwise take place in the selective absorbent from the vapors rising from the desulphurizing stage which condensation would lead to undue dilution of the selective absorbent and also assists in minimizing the rate at which the selective absorbent solution must be circulated and bears directly on the heat economies of the process since it reduces the volume of steam that must be later used in the deammoniation stage to expel the ammonia and maintain the desired concentration of the selective absorbent solution.

The gas liquor now substantially freed of its acidic gases passes out of the desulphurizer into pipe 36 and by proper adjustment of valves 17 and 18 can be sent either wholly or partially to the ammonia still 20 to be freed of the remainder of its ammonia content and be eliminated from the system as still waste, or may be passed through heat exchanger 16, cooling coils 15, pipe 24, into absorber 25 where its ammonia content will still be of service for the removal of more acidic gases from the untreated gases produced by the carbonization of coal in the oven 1.

The dephlegmation, by dephlegmator 34, is so limited that at the resulting moderately reduced temperature the selective absorbent solution in 35 will absorb only a minor portion of the hydrogen sulphide while preferentially absorbing substantially all of the residual ammonia from the mixture.

The admixed ammonia and acidic gases upon entering the selective absorber 35 pass through bubble-cap trays and are brought into counter-current contact with the selective absorbent through line 37. The selective absorbent solution having a high preferential absorptive affinity for ammonia removes the same from the gaseous mixture passing through the selective absorber and allows a substantial part of the acidic gases to pass out of the system at the outlet 38, from which point they can be made use of as preferred.

The selective absorbent, which now contains absorbed ammonia and relatively small amounts of acidic gases, passes from the selective absorber 35 through pipe 39 and is sent by pump 40 through the heat exchanger 41 to the upper section 42a of the deammoniator 42. In the deammoniator the selective absorbent is stripped of the ammonia absorbed in the selective absorber. This may be accomplished in a two-stage heat treatment as shown for purposes of exemplification in the accompanying drawing, but the invention is not limited in all its applications to this particular application of the principle involved.

In 42a the ammonia-laden selective absorbent flows over the trays provided with bubble-caps as illustrated and is heated with indirect steam for the removal of the bulk of the $H_2S$ it contains. The vapor mixture released may contain ammonia and hydrogen sulphide in proportion of 3-1, and a substantial proportion of that quantity of acidic gases which was incidentally absorbed with the ammonia in 35 is thereby removed, and is allowed to pass through pipe 43 to the top of the desulphurizer 33 to be dephlegmated and retreated by the selective absorbent for removal of the ammonia, which was simultaneously given off by the selective absorbent, before the residue of acidic gases is allowed to pass through the outlet 38, to be put to optional utilization.

The selective absorbent passes then to the second stage of deammonification in section 42b of the deammoniator 42, where it is given a more vigorous treatment by direct and indirect steam, which treatment serves to free the selective absorbent of a substantial amount of the remaining ammonia which was absorbed in the selective absorber 35. The selective absorbent thus comparatively freed of ammonia, collects in the base of the deammoniator and is then taken up by pump 44 and delivered to heat exchanger 16 through pipe 45 and is then returned to the selective absorber 35 through pipe 37.

The vapor distilled from the second stage of the deammoniator 42b contains $NH_3$ and $H_2S$ in proportion of about 20–1 and passes through pipe 46 to heat exchanger 41 and thence by pipe 47 to the gas inlet at the base of the primary cooler 4 to be again recycled in the gas and gas liquor for use in the further removal of acidic gases in the absorber 25.

By way of illustration, the following are given as the types of solutions which may be employed as selective absorbents in the process previously described. Such solutions may be used as are effective in diminishing the vapor pressure of ammonia in the presence of acidic gases or will raise the vapor pressure of the acidic gases as compared with the vapor pressures of ammonia and the acidic gases in simple water solution.

1. Solutions of ammonium salts, such as
   a. $NH_4CNS$
   b. $NH_4Cl$
   c. $NH_4CO_2CH_3$ (acetate)
   d. $NH_4H_2PO_4$ or $(NH_4)_2HPO_4$
   e. $(NH_4)_2SO_4$
   f. Mono- or di-ammonium salts of $C_6H_8O_7$ (citric acid)
   g. $C_6H_5 \cdot SO_3 \cdot NH_4$
2. Solutions of sulphides, such as
   NaHS
   KHS
   $Ca(HS)_2$
3. Solutions of weak acids, salts of weak bases and strong acids, such as
   Boric acid
   Nitro phenols
   $NH_4H_2PO_4$—which belongs to list #1 as well.
   Tri-ethanolamine chloride
   Stearic acid either pure or dissolved in oil
4. Neutral oils These various selective absorbents all raise the vapor pressure of acidic gases like hydrogen sulphide and carbon dioxide, but not ammonia, with respect to ammonia and the acidic gases in simple water solution; and some of the aforesaid selective absorbents also concurrently lower the vapor pressure of ammonia: and so they all have a greater selective affinity for ammonia of the gas to be purified as compared to impurities like hydrogen sulphide, carbon dioxide and the like of the gas than mere water or weak aqueous ammonia gas liquor. However, they also vary much in effectiveness, and the preferred selective absorbent is the first one above-named, a solution of ammonium thiocyanate.

While it was known that selective absorbents would selectively absorb ammonia in preference to hydrogen sulphide to a measurable extent, it has been discovered with the present process that substantially all of the ammonia can be sharply separated from substantially all of the hydrogen sulphide when present in large proportion, so that the latter may be recovered substantially pure, and likewise all of the ammonia separately recovered with less contamination of the latter by the former than in prior hydrogen sulphide gas purification processes. The efficiency, as compared with other prior gas purification processes employing ammonia as the alkalinity for absorbing hydrogen sulphide from gas containing the same in large proportions in comparison to its combining weight with the ammonia of the gas, is outstanding since for the first time it is possible with the use of ammonia as the alkali to recover from the gas in gas purification over ninety per cent of the hydrogen sulphide free of ammonia with substantially complete and economical recovery of the ammonia in one cycle of operation.

As a specific example of a special application of this method of effectively removing ammonia from admixture with acidic gases in such manner as to allow the ammonia to be easily and economically available for return and reuse in a process cycle, I will cite the case in which each 1,000 cubic feet of coke-oven gas to which had been added approximately three times its normal content of ammonia, upon being scrubbed with approximately 4.5 gallons of weak ammonia liquor yielded a fouled solution containing 9,000 grains of ammonia and 4,500 grains of hydrogen sulphide. This fouled solution after heat treatment in the desulphurizer 33 as described above, gave up 90% of its hydrogen sulphide content and approximately three-fourths its ammonia. The solution containing the unvolatilized ammonia was returned to the scrubbing system and the gaseous mixture of ammonia and hydrogen sulphide was treated in the selective absorber 35 using 2.56 gallons of a solution containing 450 grams per liter of ammonium thiocyanate as the selective absorbent. The total quantity of ammonia was absorbed under the condition of operation and approximately 75% of the hydrogen sulphide passed out of the selective absorber 35 at outlet 38; the remaining 25% was absorbed by the ammonium thiocyanate solution. In the deammonification of the fouled selective absorbent in 42, two-thirds of that quantity of hydrogen sulphide taken up by the ammonium thiocyanate solution was eliminated from the system at 38 and one-third returned to the primary cooler with the total ammonia which was extracted from the gas in the hydrogen sulphide absorption. Obviously, then, 92% of the hydrogen sulphide originally absorbed from the untreated gas is removed from the process in one cycle of operation and only 8% is returned to be extracted in the next cycle; this efficient removal of hydrogen sulphide is accompanied by substantially complete and economical recovery of any ammonia used for the process and for this reason the process is adaptable to a high degree of gas purification in one cycle of operation.

From the foregoing it appears that the gas entering the primary coolers is enriched with gaseous ammonia from the secondary stage of the deammoniator to the extent of about three times the normal ammonia content of the gas. After the primary cooling stage, the gas with its high ratio of ammonia to hydrogen sulphide enters the hydrogen sulphide absorption stage where it is scrubbed with the ammonia liquor from the primary cooling stage and part of the ammoniacal liquor from the desulphurizer, a total of about 4.5 gallons per MCF of about 2 to 4% concentration. The hydrogen sulphide is scrubbed out of the gas, leaving approximately its normal content of ammonia; and the fouled liquor about 4.5 gallons per MCF of gas treated and containing about 9,000 grains $NH_3$ and 4,500 grains $H_2S$ and some $CO_2$, $NH_3$, $H_2S$ and $CO_2$ being present in the proportions of about 6 to 3 to 1, is heated to about 62° C. and passes to the desulphurizer where substantially all of the $H_2S$ and some $CO_2$ and free ammonia are volatilized. Part of the actified liquor from the desulphurizing containing residual free ammonia (about 2.5 gallons per MCF of gas treated and containing a total of 2,250 grains $NH_3$) is recirculated to the hydrogen sulphide absorption stage where it adds sufficient volume to the regular weak liquor from the primary cooling stage to provide the required quantity of $H_2S$ scrubbing liquor. The remaining part (about 2.0 gallons per MCF and containing a total of 1,800 grains $NH_3$, its volume equalling the amount of ammonia liquor that passes from the primary cooling stage to the hydrogen sulphide absorption stage) passes to the ammonia still wherein all the free ammonia, $H_2S$ and $CO_2$ are evolved and the fixed ammonia liberated with lime. The distillation in the ammonia still requires about 4 pounds steam per MCF of gas treated and the hot vapors from the still carrying 3.7 pounds steam and containing about 1,800 grains $NH_3$ per MCF gas treated, pass into the desulphurizer to drive off the hydrogen sulphide. These hot vapors leave the desulphurizer reduced in temperature, carrying 0.7 pound steam per MCF gas treated, and are dephlegmated together with the foul vapors released in the deammoniator. The vapors from the dephlegmator are bubbled through a strong (450 g. p. l.) solution of ammonium thiocyanate. This solution has a very high absorptive capacity for ammonia and but little affinity for $H_2S$ at the temperature of operation. Substantially all of the ammonia contained in the vapors is absorbed by this solution and a high percentage of the hydrogen sulphide is released through a vent at the top of the column admixed with $CO_2$ and some water vapor. The ammonia-laden absorbent solution is fed continuously at about 70° C. to a heat exchanger where it is heated to about 95° C. and then enters the primary deammoniation stage wherein it is heated by about 1.5 pounds indirect steam per MCF gas treated. The vapors from such heating leave with about 0.6 pound steam and contain about 2,250 grains $NH_3$ and 760 grains $H_2S$ for each MCF gas treated, ammonia and hydrogen sulphide in proportions 3 to 1, and pass into the vapors entering the dephlegmation step. The mixed vapors from the desulphurizer and primary deammoniation stages pass from the dephlegmating column with about 0.75 pound steam and about 9,000 grains $NH_3$ and 5,260 grains $H_2S$ per MCF gas purified. After heating in the primary deammoniation stage the ammonia-laden selective absorbent enters the secondary deammoniation stage at about 100° C., containing about 2,630 grains $NH_3$ and 150 grains $H_2S$ per gallon of selective absorbent, the ammonia and hydrogen sulphide in proportion 20 to 1, and is there heated with about 1.0 pound indirect steam and 2 pounds direct steam per MCF gas treated. As a result of this 2.56 gallons of selective absorbent leave the deammoniator at about 100° C., give up part of their heat to the hydrogen sulphide absorbent solution passing from the hydrogen sulphide absorption stage to the desulphurizing stage, and then reenter the selective absorber where the hydrogen sulphide leaves the process admixed with some $CO_2$ at a temperature of about 40° C. The vapors of distillation leaving the secondary deammoniation stage contain about 1.9 pounds steam and 6,750 grains $NH_3$ and 380 grains $H_2S$ per MCF gas treated, pass in indirect heat exchange relation with the ammonia-laden selective absorbent passing to the primary deammoniation stage, and then are conducted to the gas in the primary cooler to enrich that gas in ammonia for the hydrogen sulphide absorption stage.

The entire sytem is a closed cycle, wherein high concentrations of ammonia are used to remove the hydrogen sulphide from the raw gas and the hydrogen sulphide is later recovered by treating the partially dephlegmated gases from the desulphurizer with the selective absorbent. The selective absorbent by its action permits not only escape through it of a high percentage of the $H_2S$ contained in these gases but accomplishes substantially complete retention of the high ammonia concentrations in the system described. The coal-gas leaving the hydrogen sulphide absorber carries the usual quantity of ammonia found in gases produced by the carbonization of coal, consequently the normal plant yield of ammonium sulphate is not reduced and that quantity of ammonia used for the hydrogen sulphide removal remains entrapped in the purification system where it is continuously recycled. An advantage of the process over other ammonia hot actification processes lies in the very low steam consumption, only 4.5 to 5.0 pounds per MCF of gas treated, and virtually no chemical consumption. The gases passing from the selective absorber are a mixture of approximately 80% $H_2S$ and 20% $CO_2$ which is readily combustible, and can be easily converted into sulphuric acid to be used for plant requirements of the material.

The deammoniator is divided into two stages to take advantage of a fact developed in the course of the process, that two-thirds of the hydrogen sulphide may be expelled in the primary stage while only a minor amount of the ammonia is simultaneously expelled. This allows return of a high percentage of the hydrogen sulphide from the deammoniator directly to the selective absorber and recirculation of nearly all of the ammonia with very little hydrogen sulphide to the raw gas in the primary cooling stage. 95% of the ammonia entering the selective absorber is driven off in the deammoniator.

In some instances it has been found that the ratio of ammonia to hydrogen sulphide in the vapors leaving the primary stage of deammoniation is less than above stated, and that the vapors may be substantially all hydrogen sulphide. In such case the vapors are introduced into the selective absorbent directly and after the dephlegmation step, that is, without dephlegmation, or are introduced at a point in the selective absorbent step where the $NH_3$ and $H_2S$ relationship in the vapors of such step is similar to that of the vapors issuing from the primary stage of deammoniation.

In the example above given the dephlegmation and selective absorbent stage are operated so that the vapors after dephlegmation and the solution in the selective absorbent stage have a temperature of about 70° C. However, it has been found advantageous to have the temperature of the vapors after the dephlegmation step and the solution in the selective absorbent stage not below about 50° C. In either case the vapors leave the selective absorbent stage at not over 40° C. which may be obtained by cooling coils inside the scrubber sections if necessary.

Lower temperatures than about 50° C. in the selective absorbent solution and in the vapors after the dephlegmation step are not preferred because at still lower temperatures there would be failure of the preferential absorption action by which nearly all of the ammonia is absorbed but almost none of the hydrogen sulphide, and also there is avoidance of a tendency for deposits of ammonium carbonates and sulphides which might plug the equipment.

It further appears that the stronger the selective absorbent solution, the more selective will be the absorption. Consequently, it is desirable that a salt of high solubility be used, and one that is not salted out when the solution absorbs ammonia. The salts $NH_4CNS$, $NH_4Cl$, and the citrate appear to be the most desirable; and of those $NH_4CNS$ is particularly so, since this selective absorbent will be especially effective and will be formed during the operation of the process and accumulate in the selective absorbent solution in sufficient quantities to compensate for any normal mechanical losses in operation. The actual production of the selective absorbent used in the process incidental to its operation therefore results in a financial advantage by avoiding any monetary outlay for the necessary reagent.

The process removes some carbon dioxide from the gas. It has been found possible to operate the system for $H_2S$ recovery in the presence of considerable amounts of carbon dioxide. This is because $H_2S$ is absorbed much more rapidly from gas than is $CO_2$. The gas scrubbing step can be accordingly designed and operated so that it is just efficient enough to remove the desired amount of $H_2S$, under which conditions the amount of $CO_2$ absorbed will be small. But when it is desired to operate for $CO_2$ removal or recovery from gas, it is merely necessary to make the gas scrubbing step of sufficient capacity to remove the desired amount of $CO_2$. The selective absorbents would be the same as those listed above with the exception of list #2. Solutions of carbonates (as $Na_2CO_3$ and $K_2CO_3$) are also selective absorbents for the process for $CO_2$ removal.

The invention as hereinabove set forth is embodied in particular form and manner but may be variously embodied within the scope of the claims hereinafter made.

I claim:

1. A process for recovery of hydrogen sulphide from coal-gas, comprising: absorbing the hydrogen sulphide by scrubbing the coal-gas with its own ammoniacal liquor fortified with ammonia to an extent greatly in excess of the normal ammonia content of such liquor, the excess being maintained by recirculation of ammonia from a further stage in the treatment system; expelling the hydrogen sulphide and part of the ammonia from the fouled scrubbing liquor by hot vapors from the distilling of ammonia from part of said liquor and returning the scrubbing liquor containing the remaining part of the ammonia to the scrubbing step; partially dephlegmating the so expelled hydrogen sulphide and admixture of ammonia and scrubbing the said gaseous mixture with a concentrated selective absorbent solution of an ammonia absorbent effective to raise the vapor pressure of hydrogen sulphide as compared with the vapor pressure of ammonia and hydrogen sulphide in simple water solution, in continuous flow into and out of contact with said gaseous mixture of hydrogen sulphide and ammonia without admixture of the selective absorbent solution with the coal gas scrubbing liquor, to effect a preferential absorption of the ammonia from the mixture, the dephlegmating being so limited that at the resulting moderately reduced temperature said absorbent solution absorbs only a minor portion of the said hydrogen sulphide while preferentially absorbing substantially all of the residual ammonia from the mixture; releasing the unabsorbed hydrogen sulphide; continuously discharging and regenerating the selective absorbent solution separately from the expelling of the hydrogen sulphide from the fouled coal-gas scrubbing-liquor by reheating and distilling to remove the residual absorbed hydrogen sulphide and the absorbed ammonia; returning the ammonia as excess to fortify the gas scrubbing liquor by recirculating the so removed constituents through the prior scrubbing steps; and recirculating said regenerated absorbent solution.

2. A process for recovery of hydrogen sulphide from coal-gas, comprising: absorbing the hydrogen sulphide by scrubbing the coal-gas with its own ammoniacal liquor fortified with ammonia to an extent greatly in excess of the normal ammonia content of such liquor, the excess being maintained by recirculation of ammonia from a further stage in the treatment system; expelling the hydrogen sulphide and part of the ammonia from the fouled scrubbing liquor by hot vapors from the distilling of ammonia from part of said liquor and returning the scrubbing liquor containing the remaining part of the ammonia to the scrubbing step; partially cooling the so expelled hydrogen sulphide and admixture of ammonia and scrubbing the said gaseous mixture with a concentrated selective absorbent solution of ammonium thiocyanate in continuous flow into and out of contact with said gaseous mixture of hydrogen sulphide and ammonia without admixture of the selective absorbent solution with the coal-gas scrubbing liquor to effect a preferential absorption of the ammonia from the mixture, the partial cooling being so limited that at the resulting temperature said absorbent solution absorbs only a minor portion of the said hydrogen sulphide while preferentially absorbing substantially all of the residual ammonia from the mixture; releasing the unabsorbed hydrogen sulphide; continuously discharging and regenerating the selective absorbent solution separately from the expelling of the hydrogen sulphide from the fouled coal-gas scrubbing liquor by reheating and distilling to remove the residual absorbed hydrogen sulphide and the absorbed ammonia; returning the ammonia as excess to fortify the gas scrubbing liquor by recirculating the so removed constituents through the prior scrubbing steps; and recirculating said regenerated absorbent solution.

3. A process for removal of acidic gases from coal-gas, comprising: absorbing the acidic gases like $H_2S$, $CO_2$, and $HCN$ by scrubbing the coal-gas with its own ammoniacal liquor fortified with ammonia to an extent greatly in excess of the normal ammonia content of such liquor, the excess being maintained by recirculation of ammonia from a further stage in the treatment system; expelling the acidic gases and part of the ammonia from the fouled scrubbing liquor by hot vapors from the distilling of ammonia from part of said liquor; partially dephlegmating the so expelled acidic gases and admixture of ammonia and scrubbing the said gaseous mixture with a concentrated selective absorbent solution of a salt effective to absorb ammonia and concurrently raise the vapor pressure of the acidic gases as compared with the vapor pressure of ammonia and the acidic gases in simple water solution, in continuous flow into and out of contact with said gaseous mixture of acidic gases and ammonia without admixture of the selective absorbent solution with the coal gas scrubbing liquor, to effect a preferential absorption of the ammonia from the mixture, the dephlegmating being so limited that at the resulting moderately reduced temperature said absorbent solution absorbs only a reduced portion of the said acidic gases while preferentially absorbing substantially all of the residual ammonia from the mixture; releasing the unabsorbed acidic gases; continuously discharging and regenerating the selective absorbent solution separately from the expelling of the acidic gases from the fouled coal-gas scrubbing liquor by reheating and distilling to remove the residual absorbed acidic gases and the absorbed ammonia; returning the ammonia as excess to fortify the gas scrubbing liquor by recirculating the so removed constituents through the prior scrubbing steps; and recirculating said regenerated absorbent solution.

4. A process for removal of acidic gases from coal-gas, comprising: an absorption stage in which the acidic gases are absorbed by scrubbing coal-gas with ammonia liquor by recirculation of ammonia from a further stage in the treatment, and an actification stage comprising the steps of expelling the acidic gases and part of the ammonia from the fouled scrubbing liquor by heat and returning the scrubbing liquor containing the remaining part of the ammonia to the scrubbing step, partially dephlegmating the so expelled acidic gases and admixture of ammonia and scrubbing the said gaseous mixture with a concentrated selective absorbent solution of an ammonia absorbent effective to raise the vapor pressure of the acidic gases as compared with the vapor pressure of ammonia and the acidic gases in simple water solution, in continuous flow into and out of contact with said gaseous mixture of acidic gases and ammonia without admixture of the selective absorbent solution with the coal-gas scrubbing liquor, to effect a preferential absorption of the ammonia from the mixture, the dephlegmating being so limited that at the resulting moderately reduced temperature said absorbent solution absorbs only a reduced portion of the said acidic gases while preferentially absorbing substantially all of the residual ammonia from the mixture, releasing the unabsorbed acidic gases, regenerating the selective absorbent solution separately from the expelling of the acidic gases from the fouled coal gas scrubbing liquor by reheating and distilling to remove the residual absorbed acidic gases and the absorbed ammonia; returning the ammonia as excess to fortify the gas scrubbing liquor by recirculating the so removed constituents through the prior scrubbing steps; and recirculating said regenerated absorbent solution.

5. A process for separating a mixture of ammonia and such weakly acidic compounds as hydrogen sulphide, hydrogen cyanide or carbon dioxide in aqueous solution into their chemical classes comprising: distilling the aqueous solution, dephlegmating the vapors of distillation, then scrubbing the vapors with a selective absorbent of an ammonia absorbent effective to raise the vapor pressure of the acidic gases as compared with the vapor pressure of ammonia and the acidic gases in simple water solution, discharging and regenerating the selective absorbent subsequently by distillation in separately controlled primary and secondary concurrent successive stages in the first of which the selective absorbent is heated to expel most of the acidic gases but relatively little of the ammonia and in the second of which the selective absorbent is subjected to higher heating to remove most of the absorbed ammonia, and in which the unvaporized residue of the spent selective absorbent flows from the first to the second stages during the regeneration in each stage, and in which the vapors of distillation are separately withdrawn from the respective stages; and returning the regenerated selective absorbent to the selective absorbent stage and the vapors of distillation from the primary stage of regeneration to the aforesaid dephlegmation stage.

6. A process for separating a mixture of ammonia and acidic gases comprising: scrubbing the mixture with a selective absorbent of a salt effective to absorb ammonia and concurrently materially increase the vapor pressure of the acidic gases above that exhibited by them in simple aqueous solutions of them and ammonia, discharging and regenerating the selective absorbent subsequently by distillation in separately controlled primary and secondary concurrent successive stages in the first of which the selective absorbent is heated to expel most of the acidic gases but relatively little of the ammonia and in the second of which the selective absorbent is subjected to higher heating to remove most of the absorbed ammonia, and in which the unvaporized residue of the spent selective absorbent flows from the first to the second stages during the regeneration in each stage, and in which the vapors of distillation are separately withdrawn from the respective stages; and returning the regenerated selective absorbent to the selective absorbent stage.

7. A process of removing hydrogen sulphide from gases containing it, comprising: continuously recirculating an aqueous liquid through a gas washing cycle in which the gas is washed in an absorption stage in the presence of sufficient ammonia to remove the hydrogen sulphide therefrom forming a solution capable of giving up ammonia and hydrogen sulphide upon heating, and through an actifying stage in which the fouled solution is actified by heating to drive off the absorbed hydrogen sulphide; treating the vapors from the actification stage with a selective absorbent solution of a salt effective to absorb ammonia and concurrently raise the vapor pressure of the acidic gases as compared with the vapor pressure of ammonia and the acidic gases in simple water solution and thereby selectively absorbing the ammonia from said vapors; regenerating the selective absorbent by preliminary controlled heating just sufficient to drive off hydrogen sulphide but not much ammonia therein and secondary separately controlled heating to remove substantially the balance of ammonia and hydrogen sulphide; returning the vapors from the primary heating to the vapors given off during the actification and the vapors from the secondary heating to the gas to be purified to enrich it in ammonia for hydrogen sulphide absorption.

8. A process of purifying gas of hydrogen sulphide, comprising washing gas containing ammonia and hydrogen sulphide in a hydrogen sulphide absorption stage with an ammoniacal absorbent solution to leave a predetermined ammonia content in the gas but to concurrently remove the hydrogen sulphide therefrom forming ammoniacal salts with the hydrogen sulphide capable of giving up hydrogen sulphide and ammonia upon heating; desulphurizing the fouled absorbent solution by heating to drive off most of the absorbed hydrogen sulphide; recirculating part of the desulphurized absorbent solution to the hydrogen sulphide absorption stage and distilling the remaining part to volatilize remaining ammonia and hydrogen sulphide therefrom; effecting the heating of the desulphurizing step with the hot vapors from the distilling step; dephlegmating the last named vapors together with the vapors driven off in the desulphurization step and then washing the same with a selective absorbent of an ammonia absorbent effective to raise the vapor pressure of the acidic gases as compared with the vapor pressure of ammonia and the acidic gases in simple water solution; deammoniating the ammonia-laden selective absorbent in a separate stage by separately controlled less vigorous primary and more vigorous secondary heating; conducting the deammoniation vapors from the primary heating to the dephlegmation step and the vapors from the secondary heating into the gas to enrich it in ammonia for the hydrogen sulphide absorption step; and recirculating the deammoniated selective absorbent from the deammoniating step back to the selective absorption step.

9. A process of purifying gas of hydrogen sulphide, comprising: washing gas containing ammonia and hydrogen sulphide in a hydrogen sulphide absorption stage with an ammoniacal absorbent solution to remove the hydrogen sulphide therefrom forming ammoniacal salts with the hydrogen sulphide capable of giving up hydrogen sulphide and ammonia upon heating; desulphurizing the fouled absorbent solution by heating to drive off most of the absorbed hydrogen sulphide; recirculating part of the desulphurized absorbent solution to the hydrogen sulphide absorption stage and distilling the remaining part to volatilize remaining ammonia and hydrogen sulphide therefrom; effecting the heating of the desulphurizing step with the hot vapors from the distilling step; dephlegmating the last named vapors together with the vapors driven off in the desulphurization step and then washing the same with a selective absorbent of a salt effective to absorb ammonia and concurrently raise the vapor pressure of the acidic gases as compared with the vapor pressure of ammonia and the acidic gases in simple water solution; deammoniating the ammonia-laden selective absorbent in a separate stage by separately controlled less vigorous primary and more vigorous secondary heating; conducting the deammoniation vapors from the primary heating to the dephlegmation step and the vapors from the secondary heating into the gas to enrich it in ammonia for the hydrogen sulphide absorption step; and recirculating the deammoniated selective absorbent from the deammoniating step back to the selective absorption step.

10. A process for the recovery of hydrogen sulphide from coal-gas, comprising: primary cooling of the gas while hot from its generation; absorbing the hydrogen sulphide by scrubbing the coal-gas with ammoniacal liquor from the primary cooling stage fortified with recirculated ammonia liquor to an extent to remove the hydrogen sulphide from the gas but leave therein ammonia initially in the gas, desulphurizing the fouled liquor by expelling the hydrogen sulphide and part of the ammonia from the fouled scrubbing liquor by hot vapors; recirculating part of the liquor from the desulphurizing step to the gas scrubbing step and distilling the remaining part to liberate residual free ammonia and fixed ammonia as hot vapors; passing the hot vapors from the distilling step while containing the free ammonia therefrom through the desulphurizing step to effect the desulphurizing therein; partially dephlegmating the mixture of hot vapors containing the expelled hydrogen sulphide and admixture of ammonia from the desulphurizing step and scrubbing the mixture with a selective absorbent solution of an ammonia absorbent effective to raise the vapor pressure of the acidic gases as compared with the vapor pressure of ammonia and the acidic gases in simple water solution, the dephlegmating being so limited that at the resulting moderately reduced temperature said absorbent solution absorbs only a minor portion of the hydrogen sulphide while preferentially absorbing substantially all of the residual ammonia from the mixture; releasing the unabsorbed hydrogen sulphide; regenerating the selective absorbent solution by reheating and distilling to remove the residual hydrogen sulphide and the absorbed ammonia in separately controlled less vigorous primary and more vigorous secondary stages; returning the vapors from the primary stage to the system ahead of the selective absorbent stage; returning the vapors from the secondary stage to the coal-gas in the primary cooling stage; and recirculating the regenerated selective absorbent to the selective absorbent stage.

11. A process for the recovery of hydrogen sulphide from coal-gas, comprising: primary cooling of the gas while hot from its generation; absorbing the hydrogen sulphide by scrubbing the coal-gas with ammoniacal liquor from the primary cooling stage fortified with recirculated ammonia liquor to an extent to remove the hydrogen sulphide from the gas but leave therein ammonia initially in the gas, desulphurizing the foul liquor by expelling the hydrogen sulphide and part of the ammonia from the fouled scrubbing liquor by hot vapors; recirculating part of the liquor from the desulphurizing step to the gas scrubbing step and distilling the remaining part to liberate residual free ammonia and fixed ammonia as hot vapors; passing the hot vapors from the distilling step while containing the free ammonia therefrom through the desulphurizing step to effect the desulphurizing therein; partially dephlegmating the mixture of hot vapors containing the expelled hydrogen sulphide and admixture of ammonia from the desulphurizing step and scrubbing the mixture with a selective absorbent solution of a salt effective to absorb ammonia and concurrently raise the vapor pressure of the acidic gases as compared with the vapor pressure of ammonia and the acidic gases in simple water solution, the dephlegmating being so limited that at the resulting moderately reduced temperature said absorbent solution absorbs only a minor portion of the hydrogen sulphide while preferentially absorbing substantially all of the residual ammonia from the mixture; releasing the unabsorbed hydrogen sulphide; regenerating the selective absorbent solution by reheating and distilling to remove the residual hydrogen sulphide and the absorbed ammonia in separately controlled less vigorous primary and more vigorous secondary stages; returning the vapors from the primary stage to the dephlegmating step between the desulphurizing step and the selective absorbent stage; returning the vapors from the secondary stage to the coal-gas in the primary cooling stage; and recirculating the regenerated selective absorbent to the selective absorbent stage.

12. A process for removal of acidic gases from coal-gas, comprising: absorbing the acidic gases by scrubbing the coal-gas with its own ammoniacal liquor fortified with ammonia to an extent greatly in excess of the normal ammonia content of such liquor, the excess being maintained by recirculation of ammonia from a further stage in the treatment system; expelling the acidic gases and part of the ammonia from the fouled scrubbing liquor by hot vapors from the distilling of ammonia from part of said liquor and returning the scrubbing liquor containing the remaining part of the ammonia to the scrubbing step; partially dephlegmating the so expelled acidic gases and admixture of ammonia and scrubbing the mixture with a selective absorbent solution of an ammonia absorbent effective to raise the vapor pressure of the acidic gases as compared with the vapor pressure of ammonia and the acidic gases in simple water solution, the dephlegmating being so limited that at the resulting moderately reduced temperature said absorbent solution absorbs only a reduced portion of the said acidic gases while preferentially absorbing substantially all of the residual ammonia from the mixture; releasing the unabsorbed acidic gases from contact with the selective absorbent at a temperature of approximately 40° C.; regenerating the selective absorbent solution by reheating and distilling to remove the residual absorbed acidic gases and the absorbed ammonia; returning the ammonia as excess to fortify the gas scrubbing liquor by recirculating the so removed constituents through the prior scrubbing steps; and recirculating said regenerated absorbent solution.

13. A process for recovery of hydrogen sulphide from coal-gas, comprising: absorbing the hydrogen sulphide by scrubbing the coal-gas with its own ammoniacal liquor fortified with ammonia to an extent greatly in excess of the normal ammonia content of such liquor, the excess being maintained by recirculation of ammonia from a further stage in the treatment system; expelling the hydrogen sulphide and part of the ammonia from the fouled scrubbing liquor by hot vapors from the distilling of ammonia from part of said liquor and returning the scrubbing liquor containing the remaining part of the ammonia to the scrubbing step; scrubbing the mixture with a selective absorbent solution of a salt effective to absorb ammonia and concurrently raise the vapor pressure of the acidic gases as compared with the vapor pressure of ammonia and the acidic gases in simple water solution to effect a preferential absorption of the ammonia at a moderately reduced temperature at which said absorbent solution absorbs only a minor portion of the said hydrogen sulphide while preferentially absorbing substantially all of the residual ammonia from the mixture; releasing the unabsorbed hydrogen sulphide; regenerating the selective absorbent solution by reheating and distilling to remove the residual absorbed hydrogen sulphide and the absorbed ammonia; returning the ammonia as excess to fortify the gas scrubbing liquor by recirculating the so removed constituents through the prior scrubbing steps; and recirculating said regenerated absorbent solution.

14. A process for the recovery of hydrogen sulphide from coal-gas, comprising: primary cooling of the gas while hot from its generation; absorbing the hydrogen sulphide by scrubbing the coal-gas with ammoniacal liquor from the primary cooling stage fortified with recirculated ammonia liquor to an extent to remove the hydrogen sulphide from the gas but leave therein ammonia initially in the gas, desulphurizing the fouled liquor by expelling the hydrogen sulphide and part of the ammonia from the fouled scrubbing liquor by hot vapors; recirculating part of the liquor from the desulphurizing step to the gas scrubbing step and distilling the remaining part to liberate residual free ammonia and fixed ammonia as hot vapors; passing the hot vapors through the desulphurizing step to effect the desulphurizing therein; partially dephlegmating the mixture of hot vapors containing the expelled hydrogen sulphide and admixture of ammonia from the desulphurizing step and scrubbing the mixture with a selective absorbent solution that effects a preferential absorption of the ammonia, the dephlegmating being so limited that at the resulting moderately reduced temperature said absorbent solution absorbs only a minor portion of the hydrogen sulphide while preferentially absorbing substantially all of the residual ammonia from the mixture; releasing the unabsorbed hydrogen sulphide; regenerating the selective absorbent solution by reheating and distilling to remove the residual hydrogen sulphide and the absorbed ammonia in primary and secondary stages; returning the vapors from the primary stage to the system at a zone in the selective absorbent stage where the $NH_3$ and $H_2S$ relationship in the vapors in such stage is similar to that of the vapors issuing from said primary stage; returning the vapors from the secondary stage to the coal-gas in the primary cooling stage; and recirculating the regenerated selective absorbent to the selective absorbent stage.

15. A process for the recovery of hydrogen sulphide from coal-gas, comprising: primary cooling of the gas while hot from its generation; absorbing the hydrogen sulphide by scrubbing the coal-gas with ammoniacal liquor from the primary cooling stage fortified with recirculated ammonia liquor to an extent to remove the hydrogen sulphide from the gas but leave therein ammonia initially in the gas, desulphurizing the fouled liquor by expelling the hydrogen sulphide and part of the ammonia from the fouled scrubbing liquor by hot vapors; recirculating part of the liquor from the desulphurizing step to the gas scrubbing step and distilling the remaining part to liberate residual free ammonia and fixed ammonia as hot vapors; passing the hot vapors through the desulphurizing step to effect the desulphurizing therein; partially dephlegmating the mixture of hot vapors containing the expelled hydrogen sulphide and admixture of ammonia from the desulphurizing step and scrubbing the mixture with a selective absorbent solution, of an ammonia absorbent effective to raise the vapor pressure of the acidic gases as compared with the vapor pressure of ammonia and the acidic gases in simple water solution, the dephlegmating being so limited that at the resulting moderately reduced temperature said absorbent solution absorbs only a minor portion of the hydrogen sulphide while preferentially absorbing substantially all of the residual ammonia from the mixture; releasing the unabsorbed hydrogen sulphide; regenerating the selective absorbent solution by reheating and distilling to remove the residual hydrogen sulphide and the absorbed ammonia in primary and secondary stages; returning the vapors from the primary stage to the system after the dephlegmation step and directly to the solution of the selective absorbent stage; returning the vapors from the secondary stage to the coal-gas in the primary cooling stage; and recirculating the regenerated selective absorbent to the selective absorbent stage.

HERBERT A. GOLLMAR.